(12) United States Patent
Lim et al.

(10) Patent No.: US 7,498,370 B2
(45) Date of Patent: Mar. 3, 2009

(54) FLAME RETARDANT THERMOPLASTIC RESIN COMPOSITION

(75) Inventors: Jong Cheol Lim, Kyongki-Do (KR); Sam Joo Yang, Kyongki-Do (KR)

(73) Assignee: Cheil Industries Inc., Kyungsangbuk-do (KR)

( * ) Notice: Subject to any disclaimer, the term of this patent is extended or adjusted under 35 U.S.C. 154(b) by 440 days.

(21) Appl. No.: 10/520,571

(22) PCT Filed: Sep. 30, 2002

(86) PCT No.: PCT/KR02/01833

§ 371 (c)(1),
(2), (4) Date: Jan. 7, 2005

(87) PCT Pub. No.: WO2004/016691

PCT Pub. Date: Feb. 26, 2004

(65) Prior Publication Data

US 2006/0014863 A1  Jan. 19, 2006

(30) Foreign Application Priority Data

Jul. 8, 2002  (KR) ............... 10-2002-0039204

(51) Int. Cl.
C08K 5/523 (2006.01)
(52) U.S. Cl. .............. 524/127; 524/140; 524/141
(58) Field of Classification Search ............ 524/127, 524/140–141, 145
See application file for complete search history.

(56) References Cited

U.S. PATENT DOCUMENTS

| | | | |
|---|---|---|---|
| 4,391,935 A | 7/1983 | Bialous et al. | |
| 4,692,488 A | 9/1987 | Kress et al. | |
| 5,061,745 A | 10/1991 | Wittmann et al. | |
| 5,204,394 A | 4/1993 | Gosens et al. | |
| 5,206,404 A | 4/1993 | Gunkel et al. | |
| 5,672,645 A | 9/1997 | Eckel et al. | |
| 6,417,319 B1 * | 7/2002 | Shibuya et al. | ............. 528/196 |

FOREIGN PATENT DOCUMENTS

| | | |
|---|---|---|
| EP | 0 970 997 A2 | 1/2000 |
| EP | 1 069 156 A1 | 1/2001 |
| JP | 59-202240 | 11/1984 |
| KR | 1999-47019 | 7/1999 |
| KR | 2002-34542 | 5/2002 |
| KR | 2001-107423 | 12/2002 |

OTHER PUBLICATIONS

Abstract of Japan Patent Application Laid-open No. 59-202,240, Nov. 16, 1984.
Abstract of Korean Patent Application Laid-open No. 2002-34542, May 9, 2002.
Abstract of Korean Patent Application Laid-open No. 2001-107423, Dec. 7, 2002.
Abstract of Korean Patent Application Laid-open No. 1999-47019, Jul. 5, 1999.

* cited by examiner

*Primary Examiner*—Peter Szekely
(74) *Attorney, Agent, or Firm*—Maria Parrish Tungol

(57) ABSTRACT

The flame retardant thermoplastic resin composition of the present invention comprises (A) 45-95 parts by weight of a thermoplastic polycarbonate resin; (B) 1-50 parts by weight of a vinyl graft copolymer; (C) 0-50 parts by weight of a vinyl copolymer or a mixture of vinyl copolymers; (D) 1-30 parts by weight of a mixture of organic phosphorous compounds (D-1) 5-95 parts by weight of a monomeric phosphoric acid ester compound or a mixture of monomeric phosphoric acid ester compounds and (D-2) 95-5 parts by weight of an oligomeric phosphoric acid ester compound or a mixture of oligomeric phosphoric acid ester compounds, per 100 parts by weight of the sum of (A), (B) and (C); and (E) 0.05-5 parts by weight of a fluorinated polyolefin resin per 100 parts by weight of the sum of (A), (B) and (C).

6 Claims, No Drawings

FLAME RETARDANT THERMOPLASTIC RESIN COMPOSITION

FIELD OF THE INVENTION

The present invention relates to a flame retardant thermoplastic resin composition with good flame retardancy, heat resistance and mechanical strength. More particularly, the present invention relates to a flame retardant thermoplastic resin composition having good flame retardancy, mechanical strength, heat resistance, processability, thermal stability, and appearance, which comprises a polycarbonate resin, a rubber modified vinyl graft copolymer, a vinyl copolymer, a monomeric phosphoric acid ester, an oligomeric phosphoric acid ester compound and a fluorinated polyolefin resin.

BACKGROUND OF THE INVENTION

A blend of polycarbonate and vinyl copolymer should have good flame retardancy, high heat resistance and high mechanical strength because the blend is applied to heat-emitting products such as electric or electronic goods and office supplies.

To provide the blend with good flame retardancy, a halogen-containing flame retardant and/or an antimony-containing compound were used. However, the disadvantage could be observed that the halogen-containing compound is fatally harmful due to the toxic gases liberated in case of fire. Therefore, flame retardants which are prepared without a halogen-containing compound have become a major concern in this field.

It is commonly a known method to apply a phosphorus ester compound as halogen-free flame retardant to a resin composition. U.S. Pat. Nos. 4,692,488 and 5,061,745 disclose a thermoplastic resin composition comprising aromatic polycarbonate, acrylonitrile-butadiene-styrene graft copolymer, thermoplastic copolymer and monomeric phosphoric acid ester compound as flame retardant. However, the resin composition using the monomeric phosphoric acid ester compound as a flame retardant has very poor heat resistance and shows a juicing phenomenon which occurs during molding process because the flame retardant agent form the laminate on the surface due to the volatility.

As a method for overcoming the juicing problems, the method increasing the molecular weight of phosphoric acid ester is commonly used. And, as a method for increasing the molecular weight of phosphoric acid ester, the introduction of substitute group to a monomeric phosphoric acid ester compound or the use of an oligomeric phosphoric ester compound is proposed. U.S. Pat. No. 5,206,404 discloses a composition having stability against acid and hydrolysis by use of alkyl substituted aryl phosphoric ester compound. Japanese Patent Application Laid Open No. 59-202,240 discloses a process of preparing an oligomeric phosphate and the use of the oligomeric phosphate in a polyamide or polycarbonate resin composition. U.S. Pat. No. 5,204,394 also discloses a flame retardant resin composition comprising an aromatic polycarbonate resin, a styrene-containing copolymer or a graft copolymer, and oligomeric phosphate as flame retardant. Although the resin composition improves the juicing phenomenon and heat resistance, but is inferior to the resin composition using the monophosphorous esters as flame retardants in flame retardancy. Accordingly, to maintain good flame retardancy, the resin composition should contain more flame retardants than in the resin composition containing the monophosphorous esters as flame retardants.

U.S. Pat. No. 5,672,645 describes flame retardant PC/ABS resin composition whose stress cracking resistance is improved by using a combination of a monomeric phosphorus compound and an oligomeric phosphorus compound derived from bisphenol-A, resorcinol or hydroquinone. However, deterioration of heat resistance and juicing phenomenon are still observed due to the monophosphorous compound. And, as the flame retardation ability of an oligomeric phosphate ester is less than that of a monophosphorous ester in usual, the more oligomeric phosphate ester is contained in the flame retardant agent, the poorer flame retardancy of resin composition is.

The present inventors have developed a flame retardant thermoplastic resin composition that comprises a polycarbonate resin, a rubber modified vinyl graft copolymer, a vinyl copolymer, a monomeric phosphoric acid ester compound, an oligomeric phosphoric acid ester and a fluorinated polyolefin resin, which has a good balance of physical properties such as flame retardancy, impact strength, heat resistance, thermal stability, processability and appearance.

OBJECTS OF THE INVENTION

An object of the present invention is to provide a flame retardant thermoplastic resin composition that comprises a polycarbonate resin, a rubber modified vinyl graft copolymer, a vinyl copolymer, a monomeric phosphoric acid ester compound, an oligomeric phosphoric acid ester and a fluorinated polyolefin resin, which has good physical properties such as impact strength, heat resistance, thermal stability, processability and appearance.

Other objects and advantages of this invention will be apparent from the ensuing disclosure and appended claims.

SUMMARY OF THE INVENTION

A flame retardant thermoplastic resin composition of the present invention comprises (A) 45 to 95 parts by weight of a thermoplastic polycarbonate resin; (B) 1 to 50 parts by weight of a vinyl graft copolymer prepared by graft-polymerizing (B-1) 5 to 95 parts by weight of a monomer mixture of (B-1.1) 50 to 95 by weight of at least one of styrene, α-methylstyrene, halogen- or allyl-substituted styrene, $C_{1-8}$ methacrylic acid alkyl ester, or $C_{1-8}$ acrylic acid alkyl ester and (B-1.2) 5 to 50 parts by weight of at least one of acrylonitrile, methacylonitrile, $C_{1-8}$ methacrylic acid alkyl ester, $C_{1-8}$ acrylic acid alkyl ester, maleic acid anhydride, or $C_{1-4}$ alkyl- or phenyl N-substituted maleimide onto (B-2) 5 to 95 parts by weight of a rubber polymer selected from the group consisting of butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl (meth)acrylate rubber complex and a mixture thereof; (C) 0 to 50 parts by weight of a vinyl copolymer or a mixture of vinyl copolymer prepared from (C-1) 50 to 95 parts by weight of at least one of styrene, a-methyl styrene, halogen or alkyl substituted styrene, $C_{1-8}$ methacrylic acid alkyl ester or $C_{1-8}$ acrylic acid alkyl ester and (C-2) 5 to 50 parts by weight of at least one of acrylonitrile, methacrylonitrile, $C_{1-8}$ methacrylic acid alkyl ester, $C_{1-8}$ acrylic acid alkyl ester, maleic acid anhydride, or $C_{1-4}$ alkyl or phenyl N-substituted maleimide; (D) 1 to 30 parts by weight of a mixture of organic phosphorous compounds (D-1) 5 to 95 parts by weight of a monomeric phosphoric acid ester compound represented by the following Formula (I) or a mixture thereof and (D-2) 95 to 5 parts by weight of an oligomeric phosphoric acid ester compound represented by the following Formula (II) or a mixture thereof, per 100 parts by weight of the sum of (A), (B) and (C):

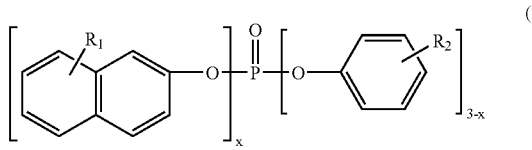

wherein $R_1$ and $R_2$ are independently hydrogen or a $C_{1-5}$ alkyl group and x is 0 or an integer from 1 to 3,

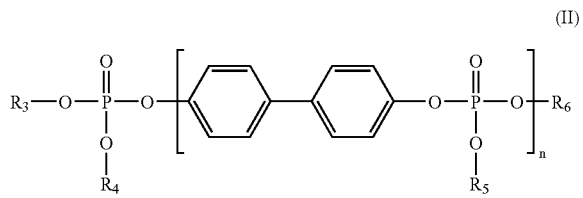

wherein $R_3$, $R_4$, $R_5$ and $R_6$ are independently a $C_{6-20}$ aryl group or an alkyl-substituted $C_{6-20}$ aryl group, respectively, and n is an integer representing the number of repeating units from 1 to 5, the average value of n in the mixture of oligomeric phosphoric acid ester is 1 to 3; and (E) 0.05 to 5.0 parts by weight of a fluorinated polyolefin resin with average particle size of about 0.05 to 1,000 μm and density of 1.2 to 2.3 g/cm³, per 100 parts by weight of (A)+(B)+(C).

DETAILED DESCRIPTION OF THE INVENTION (A) Polycarbonate Resin

The polycarbonate resin of the present invention is prepared by the reaction of a diphenol represented by the following formula (III) with a phosgene, a halogen formate or a carboxylic acid diester:

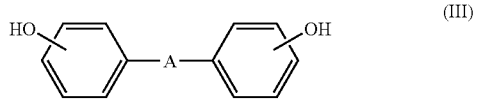

wherein A is a single bond, a $C_{1-5}$ alkylene group, a $C_{1-5}$ alkylidene group, a $C_{5-6}$ cycloalkylidene group, S or $SO_2$.

The examples of the diphenol include 4,4'-dihydroxydiphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane. More preferable diphenols are 2,2-bis-(4-hydroxyphenyl)-propane, 2,2-bis-(3,5-dichloro-4-hydroxyphenyl)-propane, and 1,1-bis-(4-hydroxyphenyl)-cyclohexane, and most preferable diphenol is 2,2-bis-(4-hydroxyphenyl)-propane called 'bisphenol A'.

In the present invention, it is preferable that the polycarbonate resin (A) has a weight average molecular weight ($M_w$) of 10,000 to 200,000, more preferably 15,000 to 80,000.

Suitable polycarbonates incorporated into the composition of the present invention may be branched in a known manner, in particular preferably by incorporation 0.05 to 2 mol %, based to total quantity of diphenols used, of tri- or higher functional compounds, for example, those with three or more phenolic groups.

A homopolymer of polycarbonate, a copolymer of polycarbonate or a mixture thereof may be used in this invention. Some portion of the polycarbonate resin may be replaced with an aromatic polyester-carbonate resin that is obtained by polymerization in the presence of an ester precursor, such as difunctional carboxylic acid.

(B) Rubber Modified Vinyl Graft Copolymer

The rubber modified vinyl graft copolymer according to the present invention is prepared by graft copolymerizing (B-1) 5 to 95 parts by weight of a monomer mixture of (B-1.1) 50 to 95 parts by weight of at least one of styrene, α-methylstyrene, halogen- or alkyl-substituted styrene, $C_{1-8}$ methacrylic acid alkyl ester, or $C_{1-8}$ acrylic acid alkyl ester and (B-1.2) 5 to 50 parts by weight of at least one of acrylonitrile, methacylonitrile, $C_{1-8}$ methacrylic acid alkyl ester, $C_{1-8}$ acrylic acid alkyl ester, maleic acid anhydride, or $C_{1-4}$ alkyl- or phenyl N-substituted maleimide onto (B-2) 5 to 95 parts by weight of a rubber polymer selected from the group consisting of butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl (meth)acrylate rubber complex and a mixture thereof.

The $C_{1-8}$ methacrylic acid alkyl ester or the $C_{1-8}$ acrylic alkyl ester is ester of methacrylic acid or acrylic acid respectively with monohydric alcohol with 1 to 8 carbon atoms. The examples of the acid alkyl ester include methacrylic acid methyl ester, methacrylic acid ethyl ester, acrylic acid ethyl ester, acrylic acid methyl ester, or methacrylic acid propyl ester.

Preferable examples of the rubber modified vinyl graft copolymer (B) are grafted-copolymers obtained by graft polymerizing a mixture of styrene, acrylonitrile, and optionally (meth)acrylic acid alkyl ester onto butadiene rubber, acryl rubber, or styrene-butadiene rubber.

Another preferable examples of the rubber modified vinyl graft copolymer (B) are grafted-copolymers obtained by graft polymerizing (meth)acrylic acid alkyl ester onto butadiene rubber, acryl rubber, or styrene-butadiene rubber.

The most preferable example of the rubber modified vinyl graft copolymer (B) is an acrylonitrile-butadiene-styrene (ABS) resin.

The rubber polymer (B-2) to prepare the rubber modified vinyl graft copolymer has preferably an average particle size of about 0.05 to 4.0 μm considering the impact strength and appearance.

The rubber modified graft copolymer according to the present invention can be prepared through a conventional polymerization process such as emulsion, suspension, solution, or bulk process. Among these processes, preferable method is the emulsion or bulk polymerization in which said vinyl monomers are added to the rubber polymer using an initiator.

(C) Vinyl Copolymer

The vinyl copolymer of the present invention is a vinyl copolymer or a mixture of vinyl copolymer that is prepared from (C-1) 50 to 95 parts by weight of at least one selected from the group consisting of styrene, α-methyl styrene, halogen or alkyl substituted styrene, $C_{1-8}$ methacrylic acid alkyl ester and $C_{1-8}$ acrylic acid alkyl ester and (C-2) 5 to 50 parts by weight of at least one selected from the group consisting of acrylonitrile, methacrylonitrile, $C_{1-8}$ is methacrylic acid alkyl ester, $C_{1-8}$ acrylic acid alkyl ester, maleic acid anhydride, and $C_{1-4}$ alkyl or phenyl N-substituted maleimide The $C_{1-8}$ methacrylic acid alkyl ester or $C_{1-8}$ acrylic acid alkyl ester is ester of methacrylic acid or acrylic acid respectively with monohydric alcohol with 1 to 8 carbon atoms. The examples of the acid alkyl ester include methacrylic acid methyl ester, methacrylic acid ethyl ester, acrylic acid ethyl ester, acrylic acid methyl ester, or methacrylic acid propyl ester.

The vinyl copolymer (C) can be produced as by-products when preparing the rubber modified vinyl-grafted copolymer (B). The by-products are mostly produced when an a large quantity of monomers are grafted onto a small amount of rubber polymer or when a chain transfer agent is used in excess. The amount of the vinyl copolymer (C) to be used in this invention does not include the amount of the by-products that might be produced during preparation of the rubber modified vinyl-grafted copolymer (B).

The preferable examples of the vinyl copolymer (C) are those prepared from monomer mixture of styrene, acrylonitrile, and optionally methacrylic acid methyl ester; monomer mixture of α-methyl styrene, acrylonitrile, and optionally methacrylic acid methyl ester; or monomer mixture of styrene, α-methyl styrene acrylonitrile, and optionally methacrylic acid methyl ester. The vinyl copolymer is preferably prepared by emulsion, suspension, solution, or bulk process, and has a preferable weight average molecular weight ($M_w$) of about 15,000 to 400,000.

Another preferable vinyl copolymer (C) are copolymers prepared from a mixture of methacrylic acid methyl ester monomers and optionally acrylic acid methyl ester monomers or acrylic acid ethyl ester monomers. The methacrylic acid methyl ester copolymer (C) of the present invention is preferably prepared by emulsion, suspension, solution or bulk process, and has a weight average molecular weight ($M_w$) of about 20,000 to 250,000.

Another preferred copolymers (C) to be incorporated into the composition of the invention are random copolymers of styrene and maleic acid anhydride, which is prepared by a continuous bulk process and a solution process. The maleic acid anhydride is preferably used in the amount of about 5 to 50% by weight. The copolymer of styrene and maleic acid anhydride has a weight average molecular weight ($M_w$) of about 20,000 to 200,000 and an intrinsic viscosity of about 0.3 to 0.9.

The styrene for preparation of the component (C) in this invention can be replaced by p-methylstyrene, vinyltoluene, 2,4-dimethylstyrene, or α-methylstyrene.

The vinyl copolymer (C) is used in single or in combination as a mixture.

(D) Organic Phosphorous Compound (D-1) Monomeric Phosphoric Acid Ester Compound

The monomeric phosphoric acid ester compound according to the present invention is represented by the following Formula (I). The monomeric phosphoric acid ester compound may be used in single or in combination as a mixture.

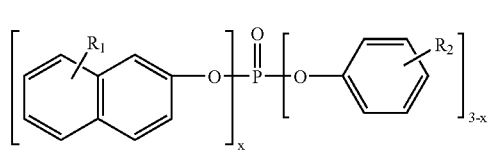

(I)

wherein $R_1$ and $R_2$ are independently hydrogen or a $C_{1-5}$ alkyl group, and x is 0 or an integer of 1 to 3. Preferably, $R_1$ and $R_2$ are hydrogen or methyl, ethyl, isopropyl or t-butyl group.

The monomeric phosphoric acid ester compound according to the present invention can be prepared through a conventional method. For example, a monomeric phosphoric acid ester compound of formular (I) can be prepared by reacting phosphorous oxychloride ($POCl_3$) with an aryl alcohol having $R_1$-substituted naphthalene group and an aryl alcohol having $R_2$-substituted phenyl group at 50~200° C. simultaneously or successively. In preparation of the monomeric phosphoric acid ester compound, catalysts are may be used, for example, the catalysts are aluminum chloride ($AlCl_3$), magnesium chloride ($MgCl_2$), zinc chloride ($ZnCl_2$), and etc.

(D-2) Oligomeric Phosphoric Acid Ester Compound

The oligomeric phosphoric acid ester compound according to the present invention is represented by the following formula (II). The oligomeric phosphoric acid ester compound may be used in single or in combination as a mixture.

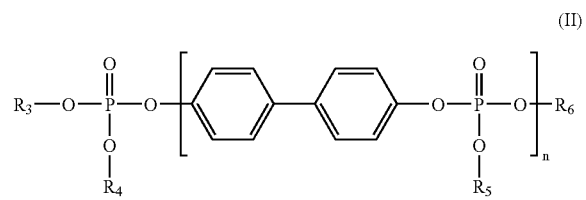

(II)

wherein $R_3$, $R_4$, $R_5$ and $R_6$ independently of one another are $C_{6-20}$ aryl group or an alkyl-substituted $C_{6-20}$ aryl group, respectively, and n is an integer representing the number of repeating units of 1 to 5. The average value of n in the mixture of oligomeric phosphoric acid ester is 1 to 3. Preferable $R_3$, $R_4$, $R_5$ and $R_6$ are a phenyl group, a naphthalene group, an alkyl-substituted phenyl group, or an alkyl-substituted naphthalene group where alkyl is methyl, ethyl, propyl, isopropyl, butyl, sec-butyl, t-butyl, isobutyl, isoamyl or t-amyl. Among them, phenyl group, naphthalene group, and alkyl-substituted phenyl group in which alkyl is methyl, ethyl, isopropyl and t-butyl are preferred.

The oligomeric phosphoric acid ester compound of formula (II) of the present invention is derived from biphenol and has an average value of n of 1 to 3. The oligomeric phosphate having n value of 1, 2, and 3 can be used alone or a mixture thereof, which is prepared in the course of polymerization, or which is formulated with independent phosphates having the different n values.

(E) Fluorinated Polyolefin Resin

The examples of the fluorinated polyolefin resin(E) of the present invention are polytetrafluoroethylene, polyvinylidenefluoride, tetrafluoroethylene/vinylidenefluoride copolymer, tetrafluoroethylene/hexafluoropropylene copolymer, and ethylene/tetrafluoroethylene copolymer. The fluorinated polyolefin resin may be used in single or in combination as a mixture.

The fluorinated polyolefin resin (E) according to the present invention is prepared by a conventional process, for example, the resin is prepared in an aqueous solvent at 7 to 71 kg/cm² and 0 to 200° C., preferably 20~100° C., in the presence of a free radical forming catalyst such as sodium-, potassium-, or ammonium-peroxydisulphate.

The fluorinated polyolefin resin is used in emulsion state or in powder state. In case using in emulsion state, dispersion of the fluorinated polyolefin resin is good, but the process will be somewhat complicated. Accordingly, if the fluorinated polyolefin resin could be uniformly dispersed in the entire resin composition to form the fibrillar network structure, it is preferable to use the fluorinated polyolefin resin in powder state.

The fluorinated polyolefin resin has preferably average particle size of 0.05 to 1,000 μm and density of 1.2 to 2.3 g/cm$^3$.

The fluorinated polyolefin resin is used in an amount of 0.05 to 5.0 parts by weight as per 100 parts by weight of (A)+(B)+(C) of the flame retardant thermoplastic resin composition according to the present invention.

The flame retardant resin composition of the present invention may further contain conventional flame retardant, such as organic phosphoric acid ester, halogen-containing organic compound, cyanurate compound, metal salt, and etc. The metal salt such as sulfonic acid metal salt and sulfon sulfonic acid metal salt may be used as a flame retardant aid. The metal salt may be used in single or in combination as a mixture.

Other additives may be contained in the resin composition of the present invention. The additives include lubricants, releasing agents, nuclear agents, antistatic agents, stabilizers, impact modifiers, inorganic pigments or dyes and the likes. The additives are employed in an amount of 0 to 60 parts by weight as per 100 parts by weight of (A)+(B)+(C) of the flame retardant thermoplastic resin composition, preferably 0.1 to 40 parts by weight.

The flame retardant thermoplastic resin composition according to the present invention can be prepared by a conventional method. For example, all the components and additives are mixed together and extruded through an extruder and are prepared in the form of pellets.

The flame retardant thermoplastic resin composition according to the present invention can be applied to electric or electronic goods, automobile parts, office supplies, etc which require good flame retardancy, weld-line strength and impact strength.

The present invention may be better understood by reference to the following examples that are intended for the purpose of illustration and are not to be construed as in any way limiting the scope of the present invention, which is defined in the claims appended hereto. In the following examples, all parts and percentage are by weight unless otherwise indicated.

EXAMPLES (A) Polycarbonate Resin

Bisphenol-A based polycarbonate with a weight average molecular weight ($M_w$) of 25,000 was used.

(B) Rubber Modified Vinyl-Grafted Copolymer 58 parts of butadiene rubber latex, 31 parts of styrene, 11 parts of acrylonitrile, and 150 parts of deionized water were mixed. To the mixture, 1.0 part of potassium oleate, 0.4 parts of cumenhydroperoxide, and 0.3 parts of t-dodecyl mercaptane chain transfer agent were added. The mixture was kept at 75° C. for 5 hours to obtain ABS latex. To the ABS latex, 1% sulfuric acid was added, coagulated and dried to obtain styrene-containing graft copolymer resin (g-ABS) in powder form.

(C) Vinyl Copolymer 71 parts of styrene, 29 parts of acrylonitrile, 120 parts of deionized water and 0.17 parts of azobisisobutylonitrile (AIBN) were mixed. To the blend, 0.5 parts of tricalciumphosphate and 0.4 parts of t-dodecyl mercaptan chain transfer agent were added. The resultant solution was suspension polymerized at 75° C. for 5 hours. The resultant was washed, dehydrated and dried. Styrene-acrylonitrile copolymer (SAN) in powder state was obtained.

(D) Organic Phosphorous Compound (D-1) Monomeric Phosphoric Acid Ester Compound (D-1.1) Triphenyl phosphate (TPP) manufactured by Daihachi Co. of Japan was used.

(D-1.2) The monomeric phosphoric acid ester compound was prepared by reacting phosphorous oxychloride with phenol and 2-naphthol. The compound is a mixture of 2.5% by weight of triphenyl phosphate, 88% by weight of a compound of Formula (I) in which $R_1$ an $R_2$ are H and x is 1, and 9% by weight of a compound of Formula (I) in which $R_1$ an $R_2$ are H and x is 2.

(D-2) Oligomeric Phosphorous Acid Ester

The oligomeric phosphorous acid ester contains 1.2% by weight of an oligomer of Formula (II) in which n is 0, 89.1% by weight of an oligomer of Formula (II) in which n is 1, and 9.7% by weight of an oligomer of Formula (II) in which n is 2 or more, and which has an average value of n=1.05, and which is a mixture of oligomeric phosphorous acid esters derived from biphenol where $R_3$, $R_4$, $R_5$ and $R_6$ are a phenyl group.

(D-3) Bisphenol-A Type Phosphoric Acid Ester

CR-741S of Daihachi in Japan was used as a bisphenol-A type phosphoric acid ester in the Comparative Examples. The bisphenol-A type phosphoric acid ester is a mixture of 3.4% by weight of an oligomer of Formula (IV) in which n is 0, 85.4% by weight of an oligomer of Formula (IV) in which n is 1, and 11.1% by weight of an oligomer of Formula (IV) in which n is 2 or more.

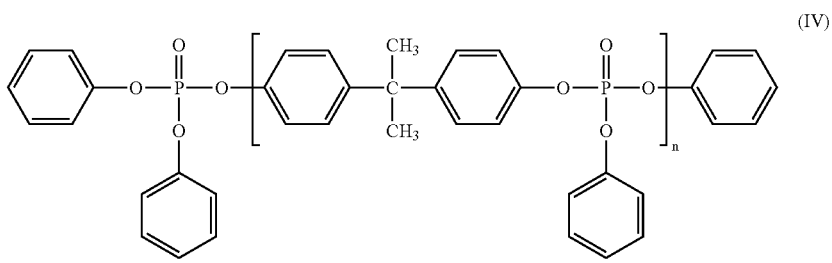

(IV)

(E) Fluorinated Polyolefin Resin

Teflon (registered trademark) 7AJ by Dupont company was used.

Examples 1~4

The components as shown in Table 1, an antioxidant and a heat stabilizer were added in a conventional mixer, then the mixture was extruded through a twin screw extruder with L/D=35 and Φ=45 mm to prepare a product in pellet form and the product was dried at 80° C. for 5 hours. The dried product was molded into test specimens using a 10 oz injection molding machine at 250° C., the test specimens were kept at the relative humidity of 50% at 23° C. for 48 hours and flame retardancy and other physical properties of the test specimens were measured.

Comparative Examples 1~4

Comparative Examples 1~4 were conducted in the same manner as in the Example 1~4 except that bisphenol-A type phosphoric acid ester (D-3) was used instead of the oligomeric phosphoric acid ester (D-2) of the present invention.

TABLE 1

| | | Examples | | | | Comparative Examples | | | |
|---|---|---|---|---|---|---|---|---|---|
| | | 1 | 2 | 3 | 4 | 1 | 2 | 3 | 4 |
| (A) Polycarbonate Resin | | 75 | 75 | 75 | 75 | 75 | 75 | 75 | 75 |
| (B) Rubber Modified Vinyl-Grafted Copolymer | | 11 | 11 | 11 | 11 | 11 | 11 | 11 | 11 |
| (C) Vinyl Copolymer | | 14 | 14 | 14 | 14 | 14 | 14 | 14 | 14 |
| (D) Organic Phosphorous Compound | (D-1.1) | 2 | 6 | 10 | — | 2 | 6 | 10 | — |
| | (D-1.2) | — | — | — | 10 | — | — | — | 10 |
| | (D-2) | 14 | 10 | 6 | 6 | — | — | — | — |
| | (D-3) | — | — | — | — | 14 | 10 | 6 | 6 |
| (F) Fluorinated Polyolefin Resin | | 0.5 | 0.5 | 0.5 | 0.5 | 0.5 | 0.5 | 0.5 | 0.5 |

The physical properties of the specimens in the Examples 1~4 and the Comparative Examples 1~4 were measured by the following manner:

(1) The flame retardancy was measured in accordance with UL94. The test specimens have a thickness of 1.6 mm.

(2) The notch Izod impact strength was measured in accordance with ASTM D256 (⅛" notched).

(3) The Vicat Softening Temperature (VST) was measured in accordance with ASTM D1525.

The test results were shown in Table 2 below.

TABLE 2

| | Examples | | | | Comparative Examples | | | |
|---|---|---|---|---|---|---|---|---|
| | 1 | 2 | 3 | 4 | 1 | 2 | 3 | 4 |
| UL 94 (1.6 mm) | V-0 | V-0 | V-0 | V-0 | Fail | V-1 | V-1 | V-1 |
| Izod impact strength (1/8", kgcm/cm) | 46 | 46 | 46 | 40 | 29 | 37 | 38 | 31 |
| VST (° C.) | 95 | 92 | 85 | 87 | 89 | 86 | 82 | 80 |

As shown in Table 2, the resin compositions according to the present invention employing a phosphorous mixture of the monomeric phosphoric acid ester and the oligomeric phosphoric acid ester show high impact strength as well as good flame retardancy and good heat resistance, compared to those employing bisphenol-A type phosphoric acid ester (D-3).

Though the oligomeric phosphoric acid ester of the present invention has low molecular weight than bisphenol-A type phosphoric acid ester of Comparative Examples, the resin compositions of the present invention show higher heat resistance (VST) and better flame retardancy than Comparative Examples. Further, in the Comparative Examples 1-4, the impact strength of the resin composition was decreased depending on the increase of the amount of the bisphenol-A type phosphoric acid ester. On the other hand, in the Example 1-4, the impact strength of a resin composition was high regardless of the relative amount of the oligomeric phosphoric acid ester.

The present invention has remarkable characteristics such as a good balance of physical properties such as flame retardancy, impact strength, heat resistance, thermal stability, processability and appearance. Therefore, the resin compositions according to the present invention may be used in heat-emitting appliances such as personal computers, facsimiles, and the like.

The present invention can be easily carried out by an ordinary skilled person in the art. Many modifications and changes may be deemed to be with the scope of the present invention as defined in the following claims.

What is claimed is:

1. A flame retardant thermoplastic resin composition comprising:
    (A) 45 to 95 parts by weight of a thermoplastic polycarbonate resin;
    (B) 1 to 50 parts by weight of a vinyl graft copolymer prepared by graft-polymerizing (B-1) 5 to 95 parts by weight of a monomer mixture of (B-1.1) 50 to 95 by weight of at least one of styrene, α-methylstyrene, halogen- or alkyl-substituted styrene, $C_{1-8}$ methacrylic acid alkyl ester, or $C_{1-8}$ acrylic acid alkyl ester and (B-1.2) 5 to 50 parts by weight of at least one of acrylonitrile, methacylonitrile, $C_{1-8}$ methacrylic acid alkyl ester, $C_{1-8}$ acrylic acid alkyl ester, maleic acid anhydride, or $C_{1-4}$ alkyl- or phenyl N-substituted maleimide onto (B-2) 5 to 95 parts by weight of a rubber polymer selected from the group consisting of butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl (meth)acrylate rubber complex and a mixture thereof;
    (C) 0 to 50 parts by weight of a vinyl copolymer or a mixture of vinyl copolymer prepared from (C-1) 50 to 95 parts by weight of at least one of styrene, α-methyl styrene, halogen or alkyl substituted styrene, $C_{1-8}$ methacrylic acid alkyl ester or $C_{1-8}$ acrylic acid alkyl ester and (C-2) 5 to 50 parts by weight of at least one of acrylonitrile, methacrylonitrile, $C_{1-8}$ methacrylic acid alkyl ester, $C_{1-8}$ acrylic acid alkyl ester, maleic acid anhydride, or $C_{1-4}$ alkyl or phenyl N-substituted maleimide;
    (D) 1 to 30 parts by weight of a mixture of organic phosphorous compounds (D-1) 5 to 95 parts by weight of a monomeric phosphoric acid ester compound represented by the following Formula (I) or a mixture thereof and (D-2) 95 to 5 parts by weight of an oligomeric phosphoric acid ester compound represented by the following Formula (II) or a mixture thereof, per 100 parts by weight of the sum of (A), (B) and (C):

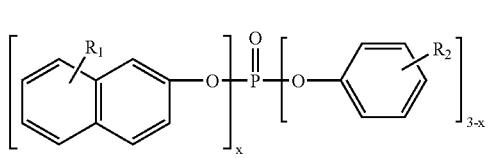

wherein $R_1$ and $R_2$ are independently hydrogen or a $C_{1-5}$ alkyl group and x is 0 or an integer from 1 to 3,

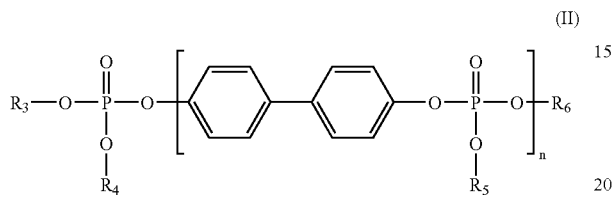

wherein $R_3$, $R_4$, $R_5$ and $R_6$ are independently a $C_{6-20}$ aryl group or an alkyl-substituted $C_{6-20}$ aryl group, respectively, and n is an integer representing the number of repeating units from 1 to 5, the average value of n in the mixture of oligomeric phosphoric acid ester is 1 to 3; and (E) 0.05 to 5.0 parts by weight of a fluorinated polyolefin resin with average particle size of 0.05 to 1,000 μm and density of 1.2 to 2.3 g/cm³, per 100 parts by weight of (A)+(B)+(C).

2. The flame retardant thermoplastic resin composition as defined in claim 1, wherein said $R_1$ and $R_2$ are independently hydrogen or alkyl group in which alkyl is methyl, ethyl, isopropyl or t-butyl.

3. The flame retardant thermoplastic resin composition as defined in claim 1, wherein said $R_3$, $R_4$, $R_5$ and $R_6$ are independently phenyl group, naphthalene group, or alkyl-substituted phenyl group in which alkyl is methyl, ethyl, isopropyl and t-butyl.

4. A molding article produced from the flame retardant thermoplastic resin composition as defined in claim 1.

5. A flame retardant thermoplastic resin composition comprising:

(A) 45 to 95 parts by weight of a thermoplastic polycarbonate resin;

(B) 1 to 50 parts by weight of a vinyl graft copolymer prepared by graft-polymerizing (B-1) 5 to 95 parts by weight of a monomer mixture of(B-1.1) 50 to 95 by weight of at least one of styrene, α-methylstyrene, halogen- or alkyl-substituted styrene, $C_{1-8}$ methacrylic acid alkyl ester, or $C_{1-8}$ acrylic acid alkyl ester and (B-1.2) 5 to 50 parts by weight of at least one of acrylonitrile, methacylonitrile, $C_{1-8}$ methacrylic acid alkyl ester, $C_{1-8}$ acrylic acid alkyl ester, maleic acid anhydrid; or $C_{1-4}$ alkyl- or phenyl N-substituted maleimide onto (B-2) 5 to 95 parts by weight of a rubber polymer selected from the group consisting of butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl(meth)acrylate rubber complex and a mixture thereof;

(C) 0 to 50 parts by weight of a vinyl copolymer or a mixture of vinyl copolymer prepared from (C-1) 50 to 95 parts by weight of at least one of styrene, α-methyl styrene, halogen or alkyl substituted styrene, $C_{1-8}$ methacrylic acid alkyl ester or $C_{1-8}$ acrylic acid alkyl ester and (C-2) 5 to 50 parts by weight of at least one of acrylonitrile, methacrylonitrile, $C_{1-8}$ methacrylic acid alkyl ester, $C_{1-8}$ acrylic acid alkyl ester, maleic acid anhydride, or $C_{1-4}$ alkyl or phenyl N-substituted maleimide;

(D) 1 to 30 parts by weight of a mixture of organic phosphorous compounds (D-1) 5 to 95 parts by weight of a monomeric phosphoric acid ester compound represented by the following Formula (I) or a mixture thereof and (D-2) 95 to 5 parts by weight of an oligomeric phosphoric acid ester compound represented by the following Formula (II) or a mixture thereof, per 100 parts by weight of the sum of (A), (B) and (C):

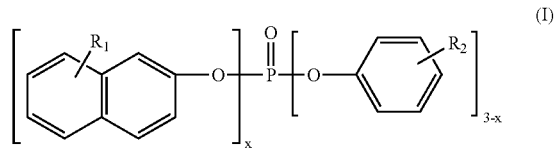

wherein $R_1$ and $R_2$ are hydrogen and x is 1 or 2,

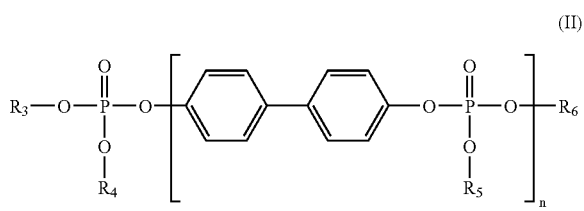

wherein $R_3$, $R_4$, $R_5$ and $R_6$ are phenyl groups and n is an integer representing the number of repeating units from 1 to 5, the average value of n in the mixture of oligomeric phosphoric acid ester is 1 to 3; and (E) 0.05 to 5.0 parts by weight of a fluorinated polyolefin resin with average particle ize of 0.05 to 1,000 μm and density of 1.2 to 2.3 g/cm³, per 100 parts by weight of (A)+(B)+(C).

6. A molding article produced from the flame retardant thermoplastic resin composition as defined in claim 5.

* * * * *